United States Patent
Davies et al.

(10) Patent No.: US 9,045,059 B1
(45) Date of Patent: Jun. 2, 2015

(54) DRIVER'S PLASTIC FOOTREST ASSEMBLY

(71) Applicant: Ford Global Technologies, LLC, Dearborn, MI (US)

(72) Inventors: Bryn Arthur Davies, Novi, MI (US); Susan Ehlert, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/183,887

(22) Filed: Feb. 19, 2014

(51) Int. Cl.
*B60N 3/06* (2006.01)
*B60N 3/04* (2006.01)

(52) U.S. Cl.
CPC . *B60N 3/06* (2013.01); *B60N 3/046* (2013.01)

(58) Field of Classification Search
CPC ............... B62D 25/20; B62D 25/2018; B62D 25/2036; B62D 25/2009; B62D 25/2045; B60N 3/06
USPC ........... 296/187.05, 187.08, 39.1, 75, 193.07, 296/205
See application file for complete search history.

(56) References Cited

U.S. PATENT DOCUMENTS

| | | | |
|---|---|---|---|
| 5,738,180 A * | 4/1998 | Hofmann et al. | 180/291 |
| 6,478,359 B2 | 11/2002 | Dendo et al. | |
| 6,634,694 B2 * | 10/2003 | Matsushita | 296/75 |
| 6,761,389 B2 * | 7/2004 | Akasaka et al. | 296/75 |
| 6,834,904 B2 | 12/2004 | Sauvonnet et al. | |
| 6,951,360 B2 * | 10/2005 | Nabert et al. | 296/75 |
| 7,055,893 B2 * | 6/2006 | Yamamura et al. | 296/187.08 |
| 7,062,990 B2 * | 6/2006 | Kato | 74/564 |
| 7,967,358 B2 * | 6/2011 | Shukuri et al. | 296/75 |
| 8,727,418 B2 * | 5/2014 | Miller | 296/75 |
| 8,764,103 B2 * | 7/2014 | Toba | 296/193.09 |
| 2002/0096904 A1 * | 7/2002 | Matsushita | 296/75 |
| 2005/0029790 A1 * | 2/2005 | Dendo et al. | 280/751 |
| 2005/0134077 A1 * | 6/2005 | Nabert et al. | 296/75 |
| 2014/0001787 A1 * | 1/2014 | Miller | 296/75 |
| 2014/0103680 A1 * | 4/2014 | Ikeno et al. | 296/97.23 |
| 2014/0137695 A1 * | 5/2014 | Permut | 74/513 |

FOREIGN PATENT DOCUMENTS

| | | |
|---|---|---|
| DE | 10032734 A1 | 1/2001 |
| EP | 0590993 A1 | 4/1994 |
| EP | 1231114 A2 | 8/2002 |
| KR | 20050023726 | 3/2005 |
| WO | 03011635 A1 | 2/2003 |
| WO | 03026922 A1 | 4/2003 |
| WO | 03029044 A1 | 4/2003 |
| WO | 2013057397 A1 | 4/2013 |

* cited by examiner

*Primary Examiner* — Gregory Blankenship
(74) *Attorney, Agent, or Firm* — Vichit Chea; Price Heneveld LLP

(57) ABSTRACT

A footrest assembly includes a reinforcement plate mounted on a foam block of a foam member. The footrest assembly is disposed in a vehicle footwell and the foam member is operably coupled to a portion of the footwell in assembly. A carpet mat is at least partially disposed over the foam member and the reinforcement plate in assembly. A footrest pad includes a plurality of clips which are received in a plurality of associated slots disposed on the reinforcement plate, thereby retaining the carpet mat between the reinforcement plate and the footrest pad in assembly.

18 Claims, 7 Drawing Sheets

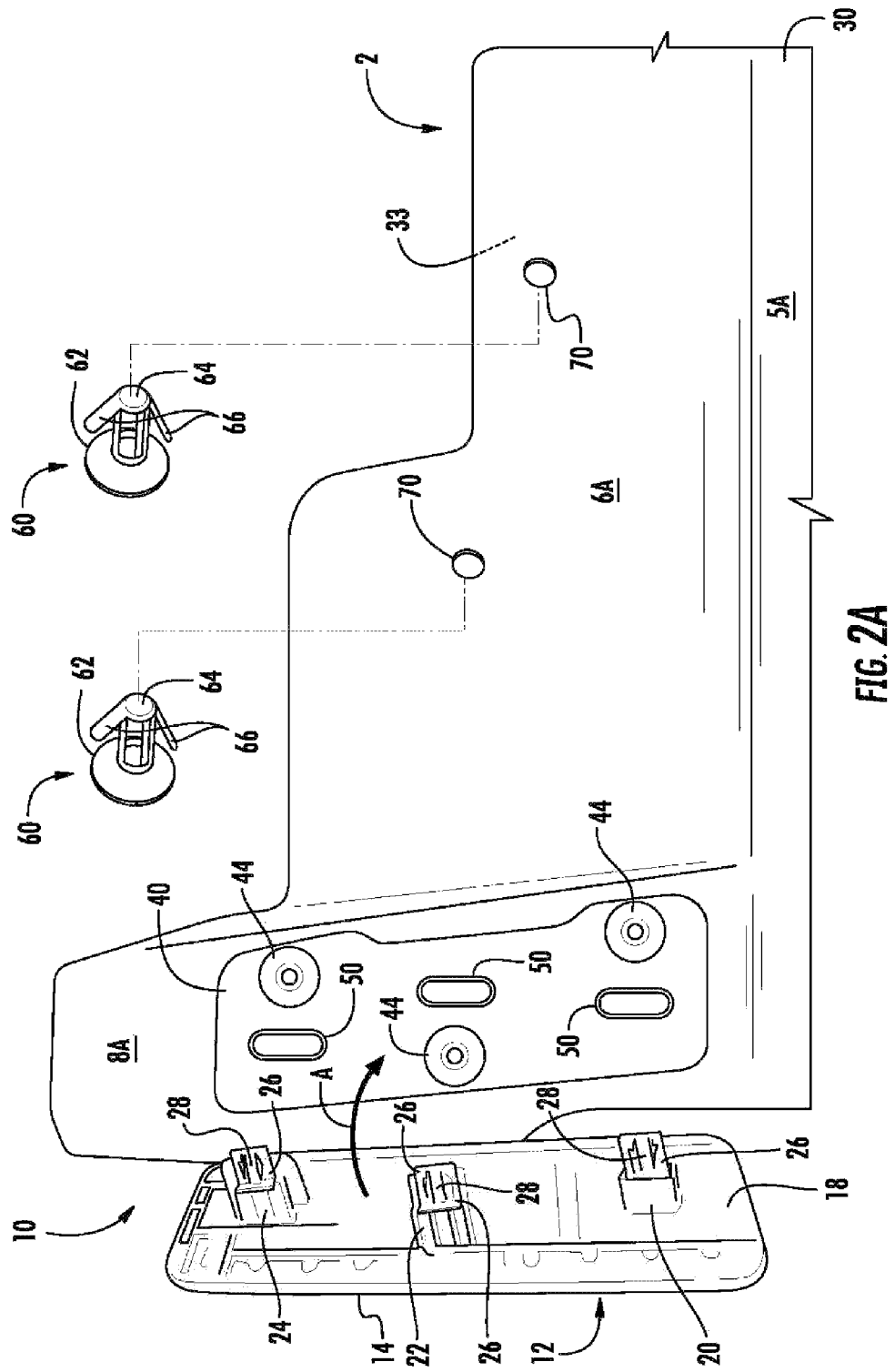

DRIVER'S PLASTIC FOOTREST ASSEMBLY

FIELD OF THE INVENTION

The present invention generally relates to a footrest assembly for use in a vehicle interior in a vehicle footwell and, more specifically, to a footrest assembly having a footrest pad which removably couples to a reinforcement plate that is coupled to a foam layer that is fixedly coupled to the sheet metal of the vehicle footwell. In this way, a portion of a vehicle carpet is positively captured between the footrest pad and reinforcement plate in assembly.

BACKGROUND OF THE INVENTION

Footrest assemblies are generally installed in a vehicle footwell in a vehicle interior on the driver's side of the vehicle interior. Generally, as a vehicle is designed, a footrest is incorporated into the design of the vehicle interior, such that component parts and attachment locations are created during the design phase of the vehicle. Attempts to provide footrest assemblies have included push-pin footrest pads coupled to foam disposed under a vehicle carpet, however, such footrest assemblies often loosen during regular use. Specifically, a user's foot pressure and movement can cause a footrest assembly attached only to a foam member of the vehicle footwell to move and loosen about the attachment locations between the footrest assembly and the foam member. The present invention provides a footrest assembly which is which is both robust and serviceable.

SUMMARY OF THE INVENTION

One aspect of the present invention includes a footrest assembly which includes a reinforcement plate mounted on a foam member. The footrest assembly is disposed in a vehicle footwell and the foam member is coupled to a sheet metal backing in assembly. A carpet mat is disposed over the foam member and the reinforcement plate, and a footrest pad, having a plurality of clips received in a plurality of slots disposed on the reinforcement plate, retains the carpet mat between the reinforcement plate and the footrest pad in assembly.

Another aspect of the present invention includes a footrest assembly disposed within a vehicle footwell. The footrest assembly includes a sheet metal layer, a foam layer and a carpet layer. The sheet metal layer includes one or more stud welds coupled to the foam layer. A reinforcement plate is mounted on the foam layer and includes a plurality of slots disposed thereon. The reinforcement plate is at least partially covered by the carpet layer in assembly. A footrest pad includes a plurality of clips which are received in the plurality of slots disposed on the reinforcement plate. In assembly, a portion of the carpet layer is positively captured between the reinforcement plate and footrest pad in assembly.

Yet another aspect of the present invention includes a footrest assembly having a sheet metal backing with a foam member coupled thereto. A reinforcement plate is operably coupled to the foam member and includes one or more slots. A carpet mat is disposed over the reinforcement plate in assembly. A footrest pad, having one or more clips aligned with and removeably received in the one or more slots disposed on the reinforcement plate, retains the carpet mat between the reinforcement plate and footrest pad in assembly.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is an exploded perspective view of the footrest assembly shown in FIG. 1;

DETAILED DESCRIPTION OF THE PREFERRED EMBODIMENTS

Figure 1:
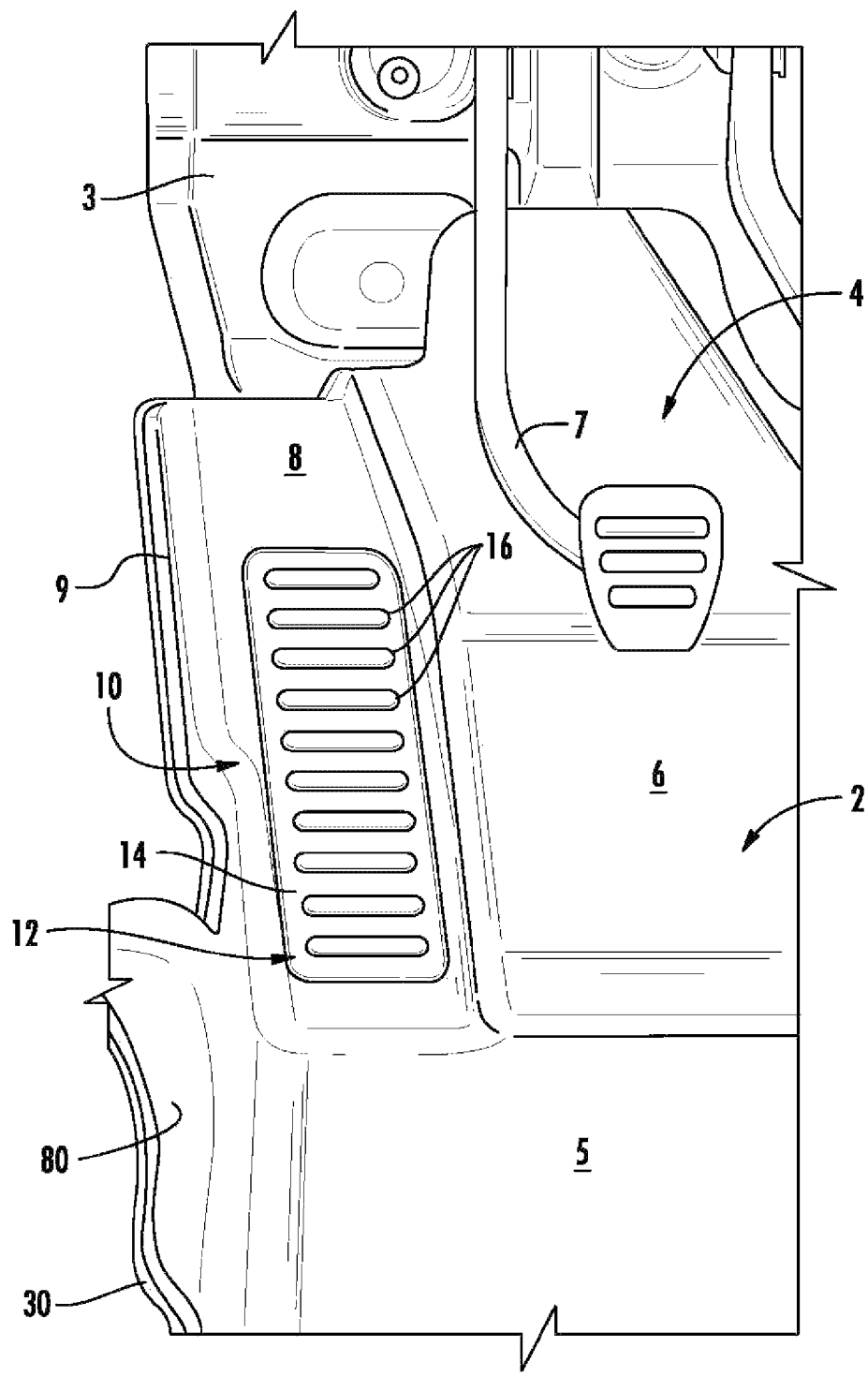
FIG. 1 is a front perspective view of a footrest assembly according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a footrest assembly for use in a vehicle interior 4. The footrest assembly 10 is shown in FIG. 1 generally disposed within a footwell 2 of the vehicle interior 4. The footwell 2 of the vehicle interior 4 generally includes a floorboard portion 5 and a dash insulator 3 disposed generally perpendicular thereto. The floorboard 5 is generally flat while the footwell 2 includes, in the embodiment of FIG. 1, a first angled portion 6, and a second angled portion 8 disposed adjacent to the dash insulator 3. The floorboard 5 and dash insulator 3 are generally supported by a sheet metal backing, which may be a stamped product, as further described below. Vehicle pedals, such as pedal 7, are generally disposed adjacent to the first angled portion 6 of the footwell 2. The second angled portion 8, as shown in FIG. 1, is disposed on a periphery portion 9 of the footwell 2 and is generally disposed at a greater angle relative to first angled portion 6. In this way, the second angled portion 8 of the footwell 2 provides for a stabilization point for a vehicle occupant as the vehicle occupant engages the vehicle pedals 7 disposed near the first angled portion 6 of the dash insulator 3.

The footrest assembly 10 further includes a footrest pad 12 having an upper contact surface 14, wherein the upper contact surface 14 further includes raised contact pads 16. The raised contact pads 16 provide a contoured or tractioned surface for the upper contact surface 14, such that the vehicle occupant can properly engage the upper contact surface 14 in a slip-resistant manner. As shown in FIG. 1, the contact pads 16 are disposed in a generally side-by-side spaced apart relationship. However, it is contemplated that a variety of configurations of contact pads 16 can be used with the footrest pad 12 without departing from the spirit of the invention. The footrest pad 12 is a generally ridged pad that can be formed from a number of materials, such as, stamped metal materials, or injection molded polymeric materials, wherein the raised contact pads 16 are integrally formed.

Referring now to FIG. 2A, the footrest pad 12 is shown in a detached position, such that an underside 18 of the footrest pad 12 is shown. The underside 18 of the footrest pad 12 includes outwardly extending clip assemblies 20, 22 and 24, each having a metal clip portion 26 which includes resilient spring tabs 28. As shown in FIG. 2A, the footwell 2 includes a foam member 30 which is a molded foam that may be comprised of molded polyolefines, and more particularly, expanded polypropylene particle (EPP) foam. The foam member 30 includes flat portion 5A and first and second angled portions 6A, 8A. As shown in FIG. 2A, second angled portion 8A defines a foam block which is substantially rigid and adapted to provide support for the footrest assembly 10 in use. As further shown in FIG. 2A, a reinforcement plate 40 is coupled to the foam member 30 at the foam block 8A. The reinforcement plate 40 is a rigid reinforcement plate which may be comprised of a metallic or plastic material. Preferably, in use with the present invention, the reinforcement plate 40 is a plastic reinforcement plate made from an injection molded thermoplastic. The reinforcement plate 40 may be about 2.5 mm thick to provide the stiffness and rigidity necessary to support the footrest pad 12 in assembly. In assembly, the reinforcement plate 40 includes a plurality of mounting apertures 42 (FIG. 3) which are adapted to receive fasteners 44 for mounting the reinforcement plate 40 to the foam member 30. The reinforcement plate 40 further includes slots 50 which are adapted to align with clips 20, 22 and 24 disposed on the underside 18 of the footrest pad 12. Specifically, the clip portions 26 of clips 20, 22 and 24 are received in the slots 50, such that the resilient portions 28 of the clip portions 26 can couple to the slots 50, thereby retaining the footrest pad 12 in place on the reinforcement plate 40. The footrest pad 12 couples to the reinforcement plate 40 as indicated by arrow A.

As further shown in FIG. 2A, fasteners 60 are received from the rear side 33 of the foam member 30 through apertures 70 disposed on or through the foam member 30. The fasteners 60, as shown in FIG. 2A, are essentially fasteners which may be referred to as "wing-clips" by those skilled in the art. Each wing-clip fastener 60 includes a head portion 62 and an engagement portion 64 having a plurality of flexible wings 66. In assembly, the flexible wings 66 engage and couple the fasteners 60 to the foam member. The fasteners 60 further include channels opening at the head portion 62 for engaging stud welds of a sheet metal backing, to couple the foam member 30 to the sheet metal backing, as further described below.

Figure 2B:
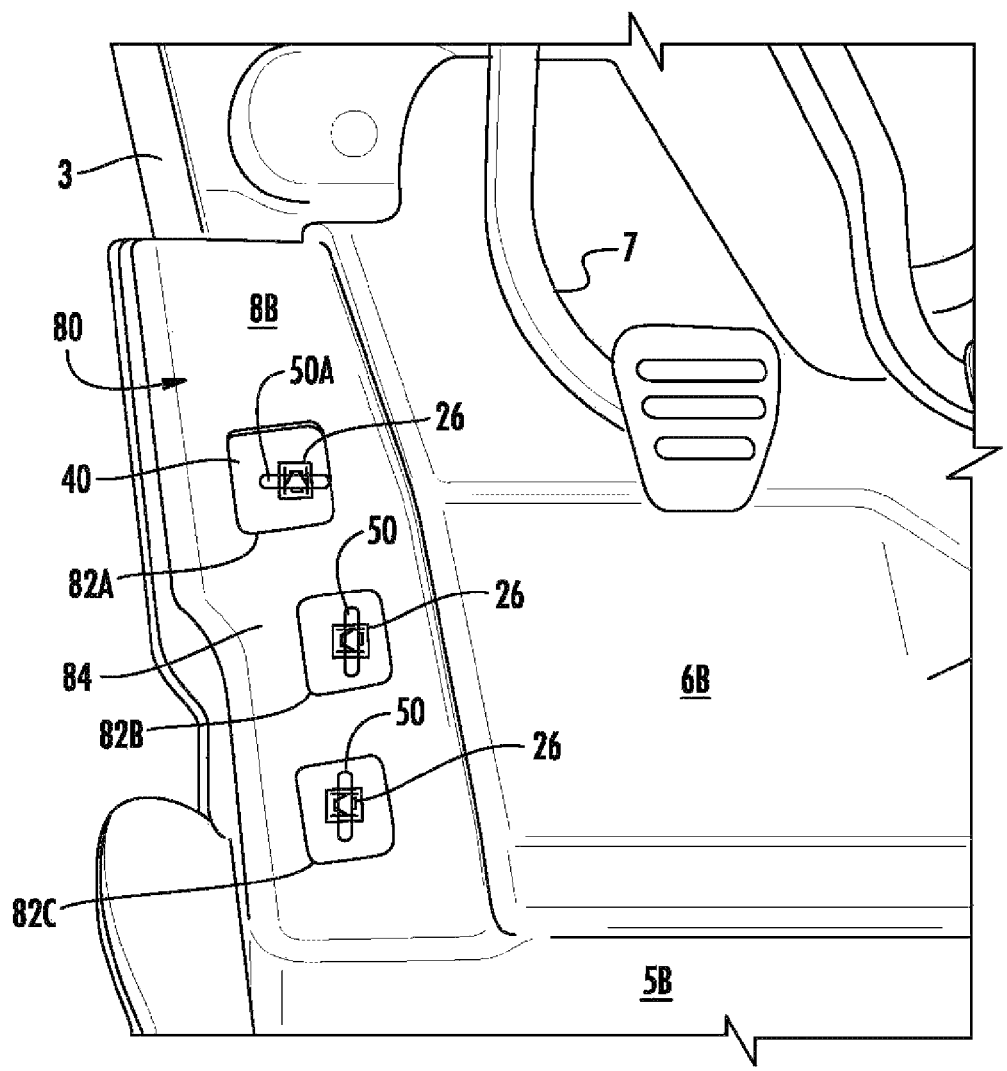
FIG. 2B is a front perspective view of attachment locations for the footrest assembly of FIG. 1.

Referring now to FIG. 2B, a carpet mat 80 is shown disposed over the foam member 30 as well as portions of the dash insulator 3 and the floorboard 5. Specifically, a flat portion 5B of the carpet mat 80 is disposed over the floorboard 5 while angled portion 6B is disposed over the dash insulator 3. The carpet mat 80 also covers the foam block 8A at a second angled portion 8B. While portion 8B of the carpet mat 80 covers the foam block 8A, receiving apertures 82A, 82B and 82C are disposed through the carpet mat 80 at portion 8B to allow access to the slots 50 disposed on the reinforcement plate 40 when the carpet mat 80 is in place. In this way, the clips 20, 22 and 24 of the footrest pad 12 can couple to the reinforcement plate 40 through receiving apertures 82A, 82B and 82C, thereby positively capturing a portion 84 of the carpet mat 80 between the footrest pad 12 and the reinforcement plate 40. As further shown in FIG. 2B, the upper most slot 50A is shown having a generally perpendicular orientation as compared to the lower slots 50 on the reinforcement plate 40. Thus, in use with the present invention, the reinforcement plate 40 may include slots 50 having varying orientations in order to properly couple the footrest pad 12 thereto. Having slots 50 of varying orientations provides for better attachment of the footrest pad 12 by including multiple retention angles.

Figure 3:
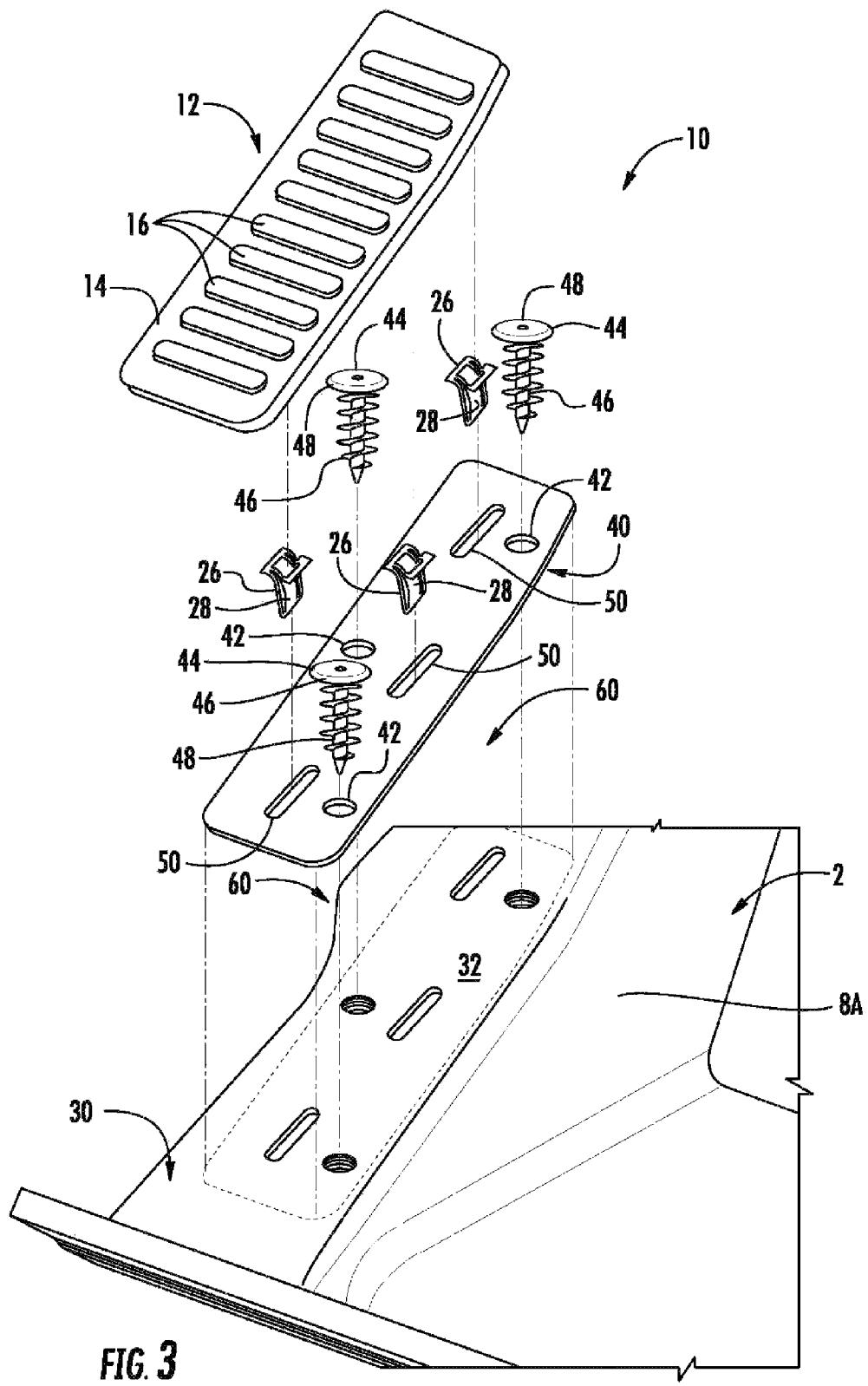
FIG. 3 is an exploded perspective view of the footrest assembly shown in FIG. 1.

Referring now to FIG. 3, the reinforcement plate 40 is shown exploded away from the foam member 30 at foam block 8A, and footrest pad 12 is further exploded away from reinforcement plate 40. Fasteners 44 are shown exploded away from the reinforcement plate 40 and define auger screws having a head portion 48 and an auger portion 46. In assembly, the auger portion 46 is adapted to auger into the foam insulation 30 at foam block 8A, thereby coupling the reinforcement plate 40 to the foam member 30 at a predetermined location 32 on foam block 8A. As further shown in FIG. 3, clip portions 26 of clips 20, 22 and 24 are aligned with associated slots 50 for removably coupling the footrest pad 12 to the reinforcement plate 40. Further, as noted above, each clip 20, 22 and 24 is aligned with an associated receiving aperture, such as receiving apertures 82A, 82B and 82C shown in FIG. 2B, to reach and engage the associated slots 50. Any number of clips, receiving apertures, and slots may be included in the present invention in order to provide a robust securement of the footrest pad 12 to the reinforcement plate 40.

Figure 4:
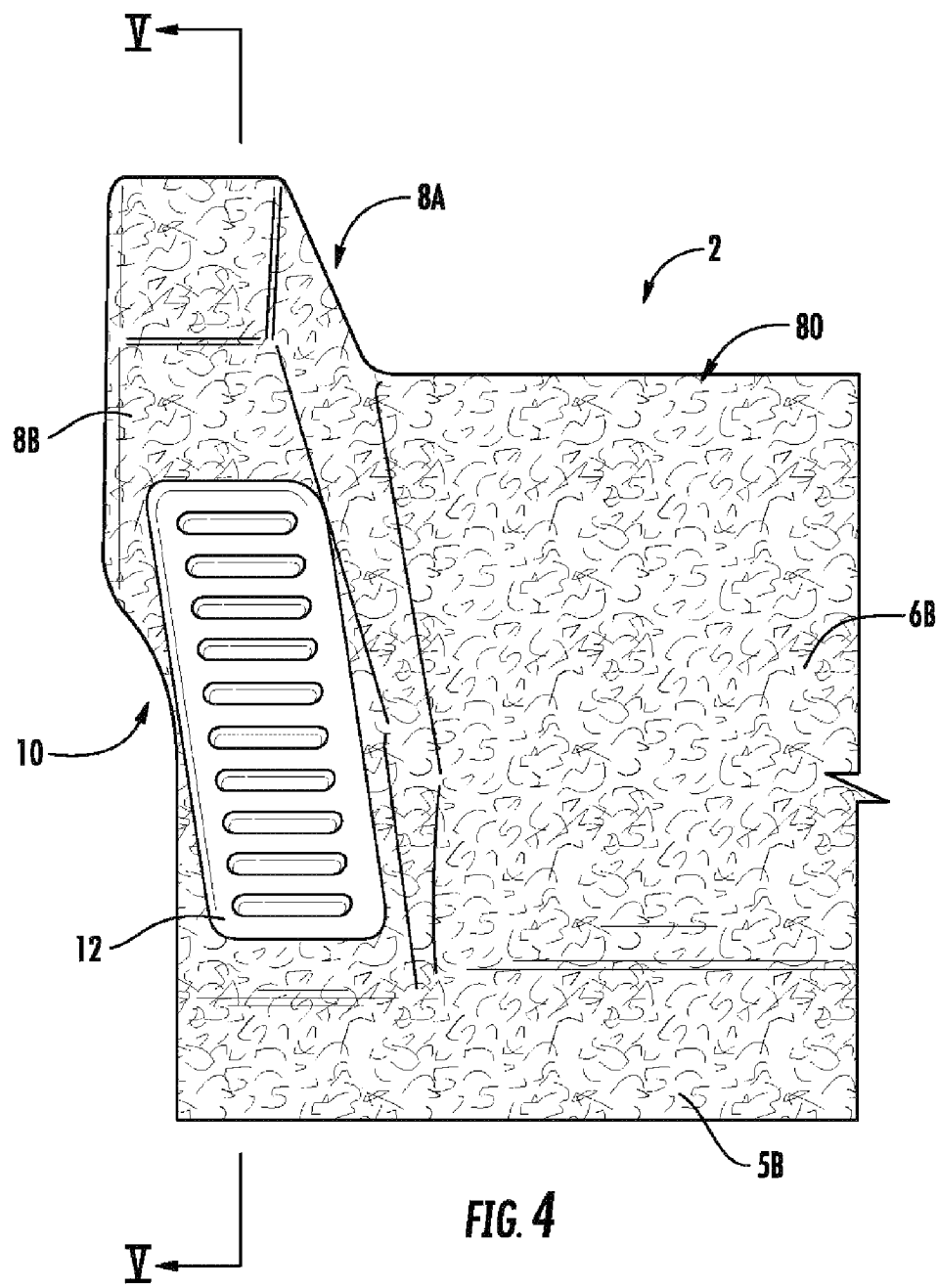
FIG. 4 is a front perspective view of the footrest assembly of FIG. 1 installed with a vehicle carpet captured therein.

Referring now to FIG. 4, the footrest assembly 10 is shown having the carpet mat 80 installed over the foam member 30. As shown, the carpet mat 80 follows the contours of the footwell 2 and foam member 30. The carpet mat 80 is positively captured or retained by the footrest assembly 10 as the footrest pad 12 couples to the reinforcement plate 40 as specifically shown in FIG. 5. Thus, a portion 84 (FIG. 5) of the carpet mat 80 is disposed between the footrest pad 12 and reinforcement plate 40, which are coupled together.

Figure 5:
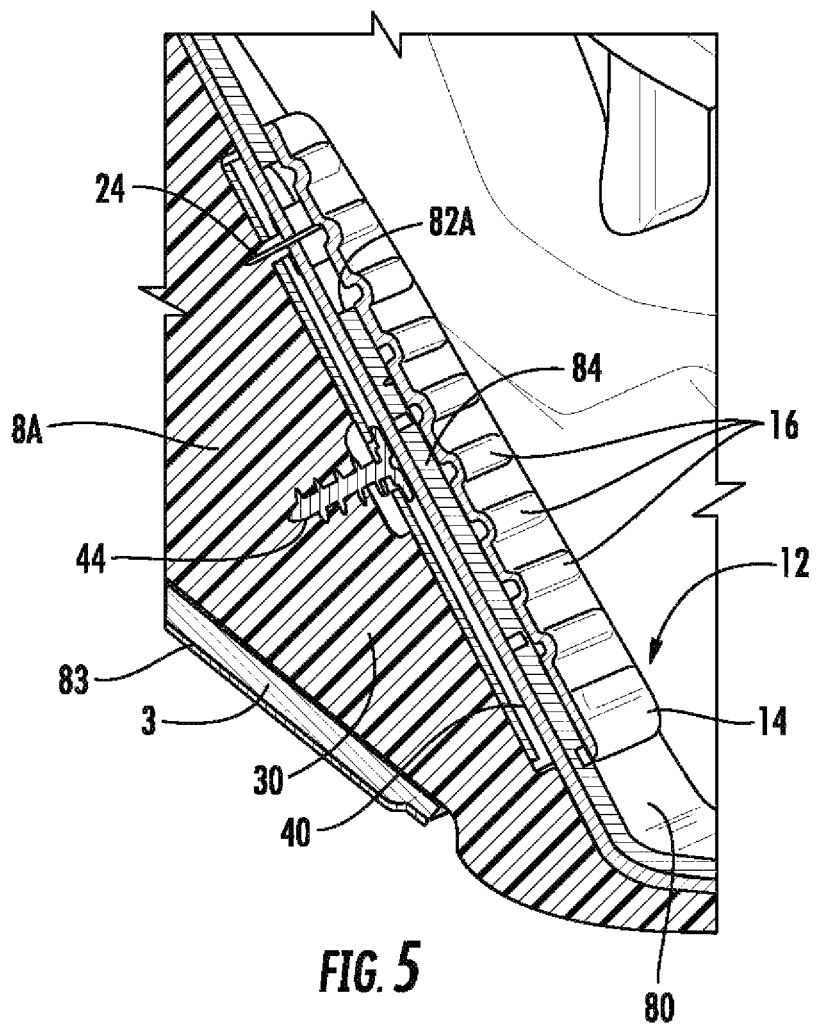
FIG. 5 is a cross-sectional view of the footrest assembly of FIG. 4 taken at line V.

Referring now to FIG. 5, the foam block 8A is shown having the reinforcement plate 40 coupled thereto using fasteners 44. The footrest pad 12 is coupled to the reinforcement plate 40 by clips 20, 22 and 24, of which upper clip 24 is shown in the cross-sectional view of FIG. 5. In this configuration, a portion 84 of the carpet mat 80 is positively captured between the footrest pad 12 and reinforcement plate 40, such that the portion 84 of the carpet mat 80 is positively retained therebetween. The foam block 8A of the foam member 30 is disposed adjacent to the dash insulator 3 and coupled to a sheet metal backing 83 as further described below.

Figure 6:
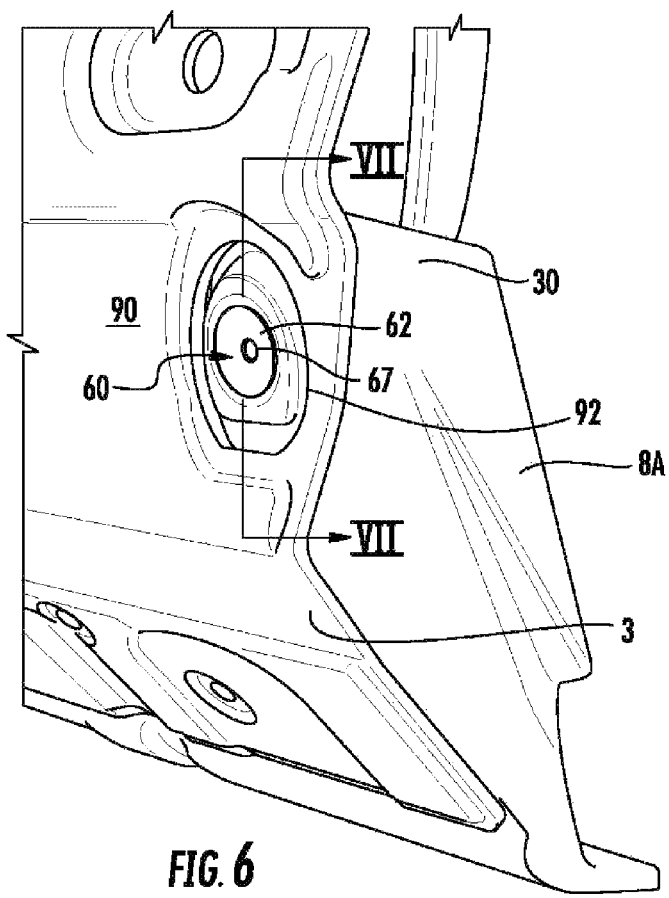
FIG. 6 is a rear perspective view of the footrest assembly of FIG. 5.
Figure 7:
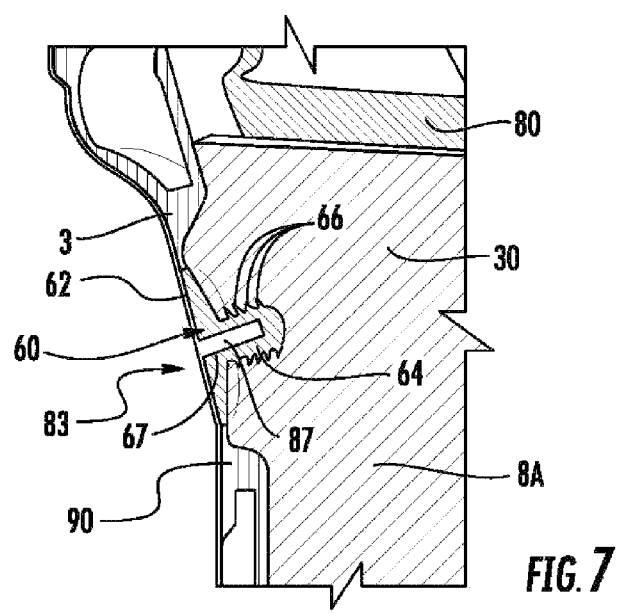
FIG. 7 is a cross-sectional view of a foam layer attachment location taken at line VII of FIG. 6.

Referring now to FIGS. 6 and 7, a fastener or engagement member 60 is shown, wherein a rear side 90 of the dash insulator 3 includes an aperture 92, thereby providing access to the head portion 62 and channel 67 of the fastener 60. As described above, the fastener 60 further includes an engagement portion 64 which is coupled to the foam member 30. As best shown in FIG. 7, the fasteners 60 are received in an aperture in foam member 30, such that the engagement portion 64 of the fastener 60 engages the foam member 30 using wing portions 66. The fastener 60 further couples to a sheet metal backing 83 at a stud weld 87 extending outwardly from the sheet metal backing 83. In coupling to the fastener 60, the stud weld 87 is received in the channel 67 of the fastener 60 in a generally push on manner. Thus, as coupled to the foam member 30, the fasteners 60 serve to couple the foam member 30 to the sheet metal backing 83 at various locations along the footwell 2, such as through the dash insulator 3 and along the floorboard 5. A plurality of locations on the foam member 30 may be used to couple the foam member 30 to the sheet metal backing 83 using stud welds 87 and fasteners 60.

Thus, in the present invention, the carpet mat 80 defines a carpet layer that covers a foam layer defined by the foam member 30. A sheet metal layer is defined by the sheet metal backing 83, to which the foam layer couples, thereby supporting the footrest assembly 10 in use.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A footrest assembly, comprising:
   a reinforcement plate supported by a foam member within a vehicle footwell, wherein the foam member is coupled to a sheet metal backing;
   a carpet mat disposed over the foam member and the reinforcement plate; and
   a footrest pad having a plurality of clips received in a plurality of slots disposed on the reinforcement plate, wherein the carpet mat is retained between the reinforcement plate and the footrest pad in assembly.

2. The footrest assembly of claim 1, wherein the footrest pad includes an upper contact surface and an underside, and further wherein the plurality of clips extend outwardly from the underside.

3. The footrest assembly of claim 2, wherein the carpet mat includes a plurality of receiving apertures aligned with the plurality of clips and the plurality of slots in assembly.

4. The footrest assembly of claim 3, including:
   one or more mounting apertures disposed on the reinforcement plate; and
   fasteners received in each of the one or more mounting apertures for mounting the reinforcement plate to the foam member.

5. The footrest assembly of claim 4, wherein the fasteners comprise auger screws.

6. The footrest assembly of claim 1, wherein the sheet metal backing includes one or more stud welds aligned with apertures disposed on the foam member.

7. The footrest assembly of claim 6, including:
   engagement members having an engagement portion and a channel, wherein the engagement portion couples to the foam member, and further wherein on of the one or more stud welds of the sheet metal backing is received in the channel.

8. A footrest assembly, comprising:
   a vehicle footwell having a sheet metal layer, a foam layer and a carpet layer, wherein the sheet metal layer includes one or more stud welds and further wherein the foam layer is coupled to the one or more stud welds using wing-clip fasteners and includes a foam block;
   a reinforcement plate mounted on the foam block and having a plurality of slots disposed thereon, the reinforcement plate at least partially covered by the carpet layer;
   a footrest pad having a plurality of clips received in the plurality of slots disposed on the reinforcement plate; and
   wherein a portion of the carpet layer is positively captured between the reinforcement plate and the footrest pad in assembly.

9. The footrest assembly of claim 8, wherein the footrest pad includes an upper contact surface and an underside, and further wherein the plurality of clips extend outwardly from the underside.

10. The footrest assembly of claim 9, wherein the carpet layer includes a plurality of receiving apertures aligned with the plurality of slots in assembly, such that the plurality of clips are received through the receiving apertures to engage the plurality of slots.

11. The footrest assembly of claim 10, including:
    one or more mounting apertures disposed on the reinforcement plate; and
    fasteners received in each of the one or more mounting apertures for mounting the reinforcement plate to the foam layer.

12. The footrest assembly of claim 11, wherein the fasteners comprise auger screws.

13. The footrest assembly of claim 12, wherein the sheet metal layer supports a dash insulator disposed adjacent to a vehicle floorboard.

14. A footrest assembly, comprising:
   a sheet metal backing coupled to a foam member using wing-clip fasteners;
   a reinforcement plate mounted to the foam member and having one or more slots;
   a carpet mat disposed over the reinforcement plate; and
   a footrest pad having one or more clips aligned with and removeably received in the one or more slots disposed on the reinforcement plate, wherein the carpet mat is retained between the reinforcement plate and footrest pad in assembly.

15. The footrest assembly of claim 14, wherein the footrest pad includes an upper contact surface and an underside, and further wherein the one or more clips extend outwardly from the underside.

16. The footrest assembly of claim 15, wherein the carpet mat includes a plurality of receiving apertures aligned with the one or more slots in assembly, such that the one or more clips are each received in an associated receiving aperture to engage an associated slot of the plurality of slots on the reinforcement plate.

17. The footrest assembly of claim 16, including:
   one or more mounting apertures disposed on the reinforcement plate; and fasteners received in each of the one or more mounting apertures for mounting the reinforcement plate to the foam member.

18. The footrest assembly of claim 17, wherein the foam member defines a foam block upon which the reinforcement plate and footrest pad are operably coupled.

* * * * *